Patented Feb. 9, 1926.

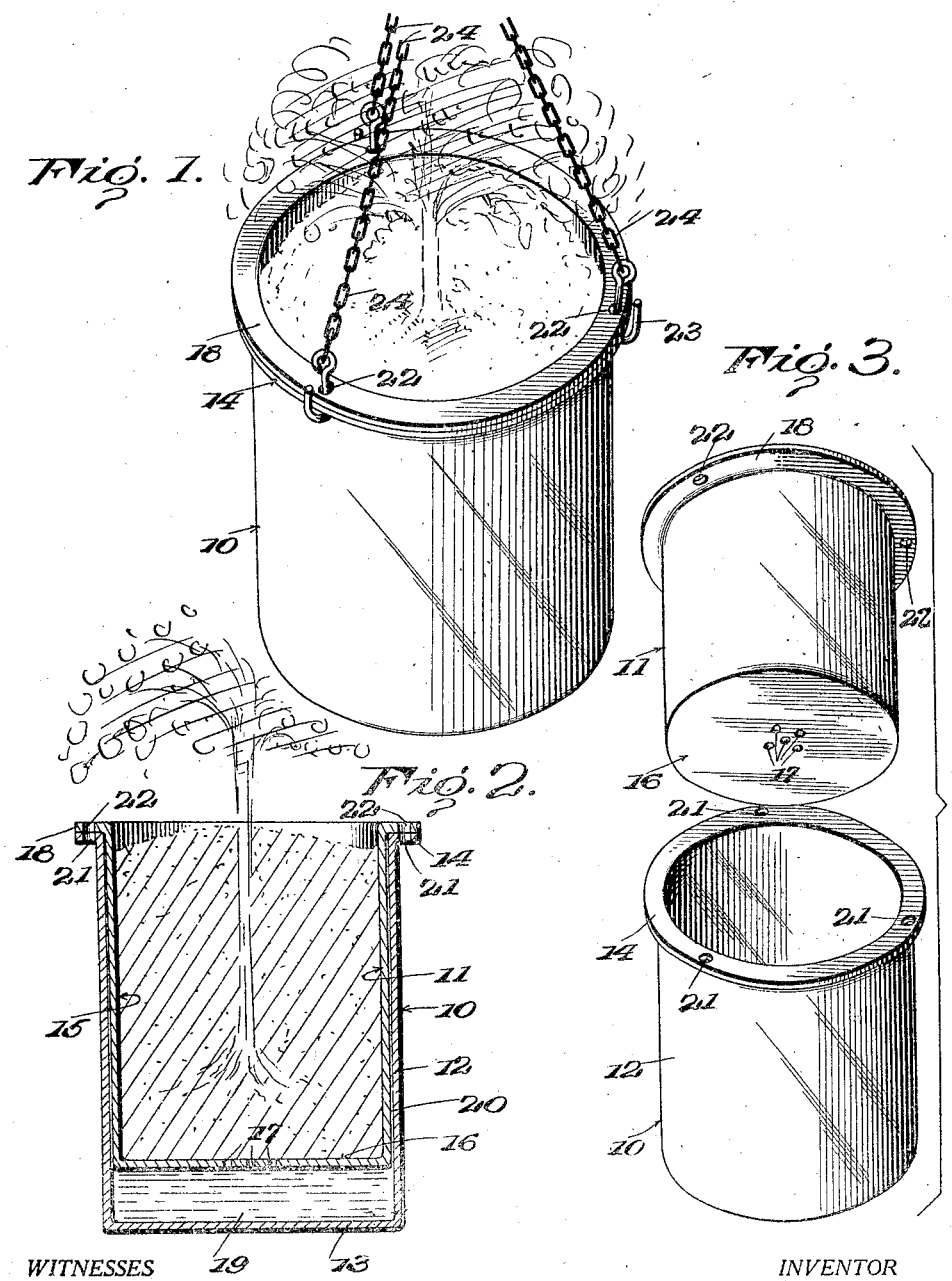

1,572,548

UNITED STATES PATENT OFFICE.

RUTH E. MATTISON, OF MONTELLO, WISCONSIN.

CONVERTIBLE FLOWERPOT AND HANGING BASKET.

Application filed October 26, 1923. Serial No. 671,024.

*To all whom it may concern:*

Be it known that I, RUTH E. MATTISON, a citizen of the United States, and a resident of Montello, in the county of Marquette and State of Wisconsin, have invented certain new and useful Improvements in Convertible Flowerpots and Hanging Baskets, of which the following is a specification.

This invention relates to an improvement in convertible flowerpots and hanging baskets, and has for its object to provide a flower pot and hanging basket which is non-breakable, which does not rust, which supplies plants or flowers with water in a proper and effective manner without danger of spilling the water, which may be conveniently hung or suspended by means of chains or the like or which may be used in the manner of an ordinary flower pot and which is of simple and durable construction, ornamental in appearance and easy and comparatively inexpensive to manufacture.

Other objects and advantages of the invention reside in certain novel features of the construction, combination and arrangement of parts which will be hereinafter more fully described and particularly pointed out in the appended claim, reference being had to the accompanying drawings forming part of this specification, and in which:

Figure 1 is a perspective view, showing the preferred embodiment of the invention in use;

Figure 2 is a view thereof in diametrical vertical section; and

Figure 3 is a group view in perspective, showing the parts of the flower pot prior to assembly.

Referring to the drawings wherein for the sake of illustration is shown the preferred embodiment of the invention, the numeral 10 designates generally an outer vessel and the numeral 11 designates generally an inner vessel. These vessels 10 and 11 are constructed entirely of aluminum.

The outer vessel 10 includes a cylindrical body portion 12 having an integral flat bottom plate 13 which closes the lower end or bottom of the vessel. The upper end of the body portion 12 has integrally formed therewith an annular and outwardly extending peripheral flange 14 which extends entirely around the marginal edge of the upper open end of the body portion 12.

The inner vessel 11 is somewhat smaller than the outer vessel and in assembly fits within the outer vessel, as shown in Figure 2. Preferably this inner vessel also includes a cylindrical body portion which is designated at 15 and which has integrally formed with its lower end a bottom plate 16. The bottom plate 16 is substantially closed except that at its center it is provided with a plurality of very small apertures 17. At the upper end of the body portion 15 an annular and outwardly extending peripheral flange 18 is provided and extends entirely around the marginal edge of the upper open end of the inner vessel 11. In the assembly the flange 18 rests on and engages the flange 14 to support the inner vessel 11 within the outer vessel 10 in such manner that the bottom plate 16 of the inner vessel is spaced from and above the bottom plate 13 of the outer vessel to define a water space 19.

In the assembly the outer peripheral surface of the body portion 15 of the inner vessel 11 does not engage the inner peripheral surface of the body portion 12 of the outer vessel 10 but these surfaces are somewhat spaced from each other to provide an annular water space 20. The water space is shown in Figure 2 as being of only a slight width and this is the preferred arrangement but obviously the width of this water space may be varied and if desired the body portion 15 of the inner vessel may be made tapering toward its lower end so that the width of the water space 20 will increase toward the lower end of the flower pot.

The flanges 14 and 18 are provided with a plurality of openings, designated at 21 and 22, respectively, and preferably three such openings are provided in each flange. The openings 21 and 22 are brought into registration in the assembly and are adapted to receive hooks 23 provided at the lower end of the hanging or suspension chains 24. If it is desired to convert the arrangement into an ordinary flower pot, the hooks 23 and chains 24 are removed and the inner vessel is rotated relative to the outer vessel to move the openings 21 and 22 out of registration whereby to make them inconspicuous and to cause the arrangement to have substantially all of the characteristics and appearances of an ordinary flower pot.

By constructing the vessels 10 and 11 of aluminum they may be manufactured in the form shown and described by drawing and punching or stamping operations and no expensive machine work is necessary.

Moreover the parts of the flower pot are not liable to become rusted, and if dropped will not be broken. Finally, the construction of the flower pot of aluminum has the advantage of enabling a symmetrical and otherwise ornamental structure to be readily produced. The ornamental effect of the flower pot is enhanced by provision of the flanges 14 and 22 and the formation of the registering openings in these flanges by which the pot may be conveniently suspended from the hanging chains 24. The water which is contained in the water spaces 19 and 20 affords a proper supply of moisture to the soil or earth within the inner vessel 11 and in which the plants or flowers grow. This supply of water is so contained as not to be liable to be spilled and an adequate supply may be provided for a considerable length of time.

I claim:

A convertible flower pot and hanging basket constructed of metal and comprising an outer cylindrical vessel having a flat closed bottom and provided with an annular and outwardly extending peripheral flange around the marginal edge of its upper end, and an inner cylindrical vessel rotatably fitted in the outer vessel and having a substantially closed bottom provided with a plurality of small apertures, said inner vessel being provided with an annular and outwardly extending peripheral flange around the marginal edge of its upper open end, the inner vessel being smaller than the outer vessel, the flange of the inner vessel resting on the flange of the outer vessel to support the inner vessel on the outer vessel with its bottom in spaced relation to the bottom of the outer vessel to define a water space, the flanges having openings adapted to be brought into registration to receive supporting devices whereby a hanging basket is provided, the openings being adapted to be positioned out of registration to provide a flower pot, the flat bottom providing a support for the flower pot.

RUTH E. MATTISON.